(12) United States Patent
Guerra et al.

(10) Patent No.: US 11,515,586 B2
(45) Date of Patent: Nov. 29, 2022

(54) ELECTRIC VEHICLE CHARGING SYSTEM

(71) Applicant: ChargePoint, Inc., Campbell, CA (US)

(72) Inventors: Paul Baron Guerra, Redwood City, CA (US); Damian S. Matthews, Aptos, CA (US); Pasquale Romano, Los Gatos, CA (US); David Baxter, Monte Sereno, CA (US)

(73) Assignee: CHARGEPOINT, INC., Campbell, CA (US)

( * ) Notice: Subject to any disclaimer, the term of this patent is extended or adjusted under 35 U.S.C. 154(b) by 466 days.

(21) Appl. No.: 16/405,592

(22) Filed: May 7, 2019

(65) Prior Publication Data

US 2019/0341661 A1   Nov. 7, 2019

Related U.S. Application Data

(63) Continuation of application No. 62/668,239, filed on May 7, 2018.

(51) Int. Cl.
*H01M 10/63* (2014.01)
*H01R 13/00* (2006.01)
(Continued)

(52) U.S. Cl.
CPC .......... *H01M 10/63* (2015.04); *B60L 53/16* (2019.02); *B60L 53/302* (2019.02); *B60L 58/26* (2019.02);
(Continued)

(58) Field of Classification Search
CPC ............... H01M 10/63; H01M 10/625; H01M 10/6568; H01M 10/44; H01M 10/486;
(Continued)

(56) References Cited

U.S. PATENT DOCUMENTS

2009/0256523 A1 * 10/2009 Taguchi ................. B60L 58/26
                                                            320/109
2010/0025006 A1   2/2010 Zhou
(Continued)

FOREIGN PATENT DOCUMENTS

CN   202025945 U  * 11/2011
WO   2016/054068 A1   4/2016

OTHER PUBLICATIONS

International Search Report and Written Opinion received for PCT Patent Application No. PCT/US2019/031149, dated Sep. 23, 2019, 14 pages.
Supplementary European search report and Search Opinion, EP App. No. 19800617.3, dated Apr. 14, 2022, 9 pages.

*Primary Examiner* — Richard Isla
*Assistant Examiner* — Dung V Bui
(74) *Attorney, Agent, or Firm* — Nicholson De Vos Webster & Elliott LLP

(57) ABSTRACT

An external electric vehicle battery thermal management system is described. An electric vehicle thermal system provides external coolant to an internal battery thermal system of an electric vehicle. The internal battery thermal system includes a liquid-to-liquid heat exchanger to cool or warm the set of batteries of the electric vehicle. The external coolant is pumped through a first side of the heat exchanger and serves as the source to cool or heat internal coolant pumped through a second side of the heat exchanger. The external coolant and the internal coolant do not mix.

16 Claims, 10 Drawing Sheets

(51) Int. Cl.
*H01M 10/48* (2006.01)
*H01M 10/625* (2014.01)
*H01M 10/6568* (2014.01)
*H01M 10/44* (2006.01)
*B60L 58/26* (2019.01)
*B60L 53/302* (2019.01)
*B60L 53/16* (2019.01)
*B60K 6/22* (2007.10)

(52) U.S. Cl.
CPC ......... *H01M 10/44* (2013.01); *H01M 10/486* (2013.01); *H01M 10/625* (2015.04); *H01M 10/6568* (2015.04); *H01R 13/005* (2013.01); *B60K 6/22* (2013.01); *B60Y 2200/91* (2013.01); *B60Y 2200/92* (2013.01); *B60Y 2300/91* (2013.01); *B60Y 2306/05* (2013.01); *H01M 2220/20* (2013.01)

(58) Field of Classification Search
CPC .. H01M 2220/20; B60L 53/302; B60L 53/16; B60L 58/26; H01R 13/005; B60K 6/22; B60Y 2200/91; B60Y 2200/92; B60Y 2300/91; B60Y 2306/05
USPC .......................................................... 320/109
See application file for complete search history.

(56) References Cited

U.S. PATENT DOCUMENTS

| | | | |
|---|---|---|---|
| 2011/0291616 A1* | 12/2011 | Kim | B64D 53/68 |
| | | | 320/109 |
| 2012/0025765 A1 | 2/2012 | Frey et al. | |
| 2012/0043935 A1 | 2/2012 | Dyer et al. | |
| 2012/0088382 A1* | 4/2012 | Konchan | B60L 53/16 |
| | | | 439/153 |
| 2013/0030622 A1 | 1/2013 | Park et al. | |
| 2013/0049972 A1* | 2/2013 | Pusch | B60Q 1/2603 |
| | | | 340/636.1 |
| 2013/0102163 A1* | 4/2013 | Basavarajappa | E05B 81/66 |
| | | | 439/34 |
| 2015/0217654 A1 | 8/2015 | Woo et al. | |
| 2015/0306974 A1* | 10/2015 | Mardall | H01M 10/656 |
| | | | 320/150 |
| 2016/0221458 A1 | 8/2016 | Lopez et al. | |
| 2017/0088007 A1 | 3/2017 | Melendez et al. | |
| 2017/0232865 A1* | 8/2017 | Christen | H01M 10/625 |
| | | | 429/120 |
| 2018/0155046 A1* | 6/2018 | Bowman | B64D 37/005 |
| 2018/0216973 A1* | 8/2018 | Irgang | B60Q 1/0052 |
| 2019/0217715 A1* | 7/2019 | Christen | G06F 3/0346 |

\* cited by examiner

ELECTRIC VEHICLE CHARGING SYSTEM

CROSS-REFERENCE TO RELATED APPLICATIONS

This application claims the benefit of U.S. Provisional Application No. 62/668,239, filed May 7, 2018, which is hereby incorporated by reference.

FIELD

Embodiments of the invention relate to the field of charging electric vehicles; and more specifically, to an electric vehicle charging system.

BACKGROUND

An electric vehicle (e.g., an all battery powered vehicle, a gasoline/electric battery powered vehicle hybrid, etc.) includes a set of one or more batteries or other energy storage devices that must periodically be charged. The performance and longevity of a battery is affected by non-optimal temperature (either too hot or too cold). For instance, if the battery gets too hot, battery cell life may decrease or in extreme cases, catastrophic failure such as the battery combusting may occur. Heat generation occurs during charging and discharging. When charging, excess heat generation occurs can negatively impact the performance and life of the batteries and the efficiency of charging. For instance, if the temperature of the battery exceeds a threshold, charging may be interrupted until the temperature drops below the threshold to prevent damage to the battery. More heat is generated the faster the battery is charged.

Some electric vehicles include a cooling system for cooling the batteries. The cooling system may include a fan and a radiator and are typically used for cooling the surface or exterior of the batteries. These cooling systems are often loud (the fans emit a loud noise that can be bothersome) and require extra weight on the vehicle.

Cooling techniques that only cool the surface or exterior of the battery may not be sufficient if the battery is being charged at a high rate. For example, some electric vehicle supply equipment (EVSE) may provide 400 kW to an electric vehicle. For fast charging, some cooling systems use a liquid coolant system where coolant is passed through internal channels of the battery to directly cool the battery cells. The coolant may be provided to the battery by an external source to reduce the volume and weight of the electric vehicle.

Future electric vehicles, such as electric vertical take-off and landing (VTOL) aircraft, may require substantially higher amounts of power being delivered in a relatively short amount of time (e.g., 600 kW-2000 kW).

SUMMARY

An external electric vehicle battery thermal management system is described. An electric vehicle thermal system provides external coolant to an internal battery thermal system of an electric vehicle. The internal battery thermal system includes a liquid-to-liquid heat exchanger to cool or warm the set of batteries of the electric vehicle. The external coolant is pumped through a first side of the heat exchanger and serves as the source to cool or heat internal coolant pumped through a second side of the heat exchanger. The external coolant and the internal coolant do not mix.

A connector for an electric vehicle is described. The connector may include power contacts to deliver current to a battery of the electric vehicle. The connector may include multiple liquid ports for quick disconnect fittings for exchanging liquid coolant with the electric vehicle. The connector may include a cutout guide feature to fit in a raised portion of a vehicle connector inlet to provide proper orientation of the connector. The connector may include a powered insertion and retraction assistance to assist coupling of the connector with the vehicle connector inlet. The connector may include a light ring to provide status information.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

An electric vehicle charging system is described. In an embodiment, an electric vehicle supply equipment (EVSE) provides external thermal management for a battery system of an electric vehicle. The electric vehicle includes a liquid-to-liquid heat exchanger as part of a battery thermal system to cool and/or warm the battery system of the electric vehicle. The EVSE may cause liquid coolant to be pumped through a first side of the liquid-to-liquid heat exchanger that serves as the source to supply cooling or heating to the liquid coolant in a second side of the liquid-to-liquid heat exchanger. The coolant provided through the first side of the liquid-to-liquid heat exchanger does not mix with the coolant of the electric vehicle that flows through the second side of the liquid-to-liquid heat exchanger. The coolant may be provided through a connector that connects the EVSE with the electric vehicle, where power is also supplied through that connector to the electric vehicle.

The EVSE includes a battery thermal controller that manages the supply of the external coolant that serves as the source of cooling or heating an internal coolant of a battery thermal system of the electric vehicle. The external coolant cools or heats the internal coolant through a liquid-to-liquid heat exchanger of a battery thermal system of the electric vehicle. The battery thermal controller may be communicatively connected with a battery management system (BMS) of the electric vehicle. The BMS knows the temperature of the battery(ies) of the battery system of the electric vehicle. The BMS can send a request to the battery thermal controller for external coolant. The request may indicate the current temperature of the battery(ies) and/or the desired temperature of the battery(ies). The battery thermal controller may transmit a response to the request that indicates an expected amount of coolant, an expected temperature of the coolant, and/or an expected temperature of the battery(ies) after providing the coolant over a certain period. The communication between the battery thermal controller and the BMS may be provided through a data communication connection between the EVSE and the electric vehicle.

The battery thermal controller is coupled with an electric vehicle (EV) thermal system that supplies the external coolant for cooling or heating the internal coolant of the battery thermal system of the electric vehicle. The EV thermal system may be located within the EVSE or may be located outside the EVSE. The battery thermal controller causes the EV thermal system to provide the coolant at a certain temperature.

Figure 1:
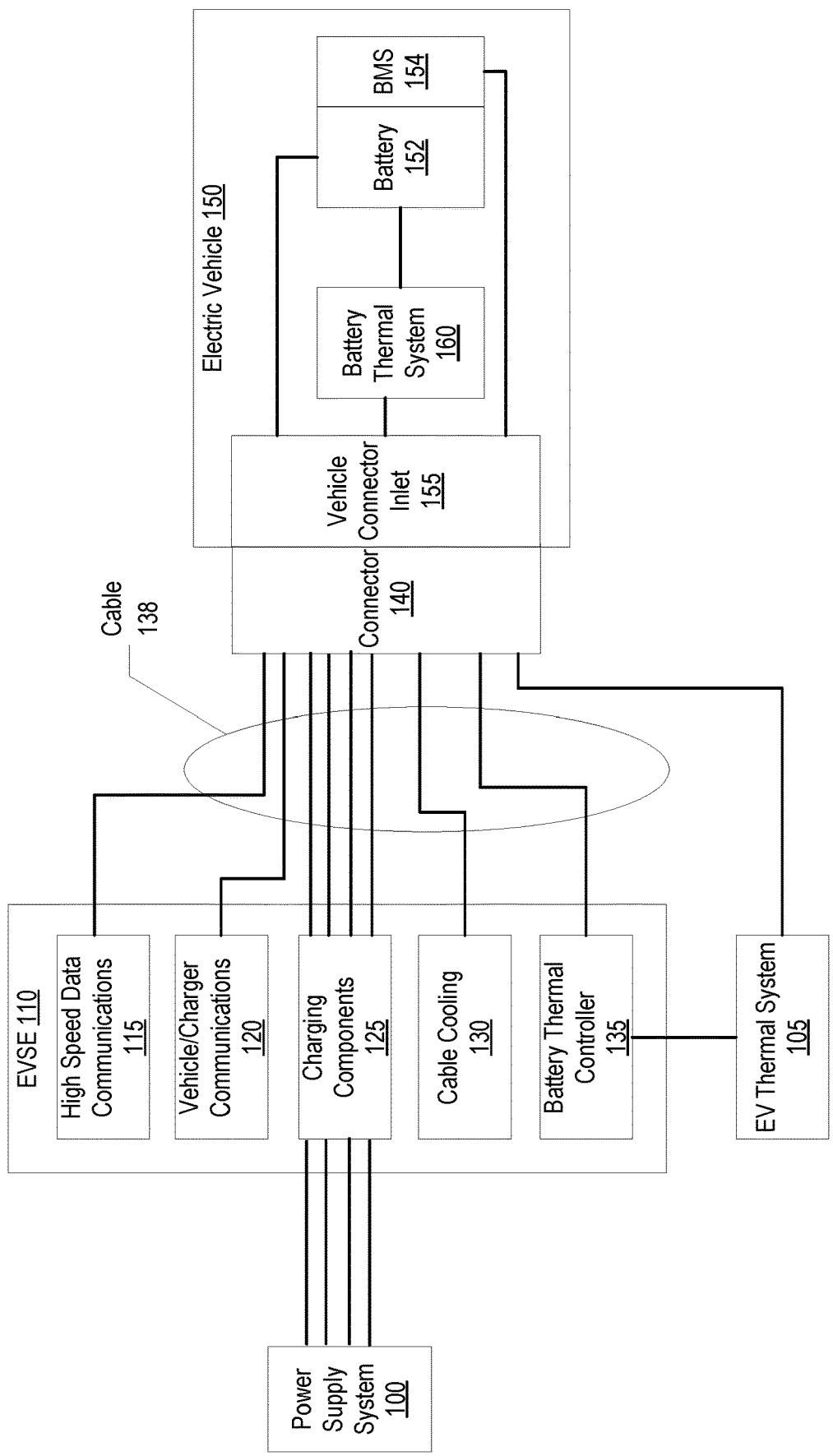
FIG. 1 shows an exemplary electric vehicle charging system including an electric vehicle battery thermal management system, according to an embodiment.

FIG. 1 shows an exemplary electric vehicle charging system including an electric vehicle battery thermal management system, according to an embodiment. The system includes the power supply system 100, the EV thermal system 105, the EVSE 110, and the electric vehicle 150. The power supply system 100 is used herein to describe the source of power in which the EVSE 110 is connected and supplies to the electric vehicle 150 for charging. The EVSE 110 may be receiving AC or DC power from the power supply system 100. In an embodiment, AC mains supply is converted to DC power by one or more power modules coupled to the EVSE 110.

The EVSE 110 is used to charge electric vehicles and provide thermal management to electric vehicles, such as the electric vehicle 150. The EVSE 110 connects to the electric vehicle 150 through the connector 140 of the cable 138 and the vehicle connector inlet 155 of the electric vehicle 150. The electric vehicle 150 is a vehicle that includes a rechargeable battery that powers propulsion of the vehicle. The electric vehicle 150 may be an all-electric vehicle that uses one or more electric motors and get their power solely from the battery system. The electric vehicle 150 may be a plug-in hybrid electric vehicle that can use a gasoline engine and an electric motor for propulsion. Example forms of the electric vehicle 150 includes an automobile, a truck, a bus, a train, an aircraft, a ship, and a tank.

The EVSE 110 supplies power through the cable 138 to charge the battery 152 of the electric vehicle 150. For instance, the EVSE 110 includes the charging components 125 that manage charging of the battery 152 of the electric vehicle 150. The use of the term battery herein refers to one or more batteries unless otherwise noted. The charging components 125 may include switches/relays, meter(s), and other electronics for managing charging of electric vehicles. As will be described in latter detail herein, the charging components 125 may include multiple power connections to charge multiple batteries of the electric vehicle 150 simultaneously and possibly at different current rates or voltages. The charging current is provided through charging connections made through the connector 140 and the vehicle connector inlet 155.

The EVSE 110 communicates with the electric vehicle 150. For instance, the EVSE 110 includes the vehicle/charger communications 120 that allows the EVSE 110 to communicate charging parameters and status with the electric vehicle 150. For instance, the vehicle/charger communications 120 may handle communication according to the J1772 standard, the CHAdeMO standard, or other communication standard. The EVSE 110 also includes the high-speed data communications 115 that may be used to exchange data of the electric vehicle 150 that is not necessarily related to managing charging. For instance, the electric vehicle 150 may send navigation information such as maps, flight plans, etc. The high-speed data communications 115 may act as a pass-through to a server. The high-speed data communications 115 may be an Ethernet connection made through the connector 140 and the connector inlet 155.

In an embodiment, the cable 138 is a liquid cooled cable. In such an embodiment, the EVSE 110 includes cable cooling 130 for cooling the liquid cooled cable. The cable cooling 130 may include a liquid to air heat exchanger. The liquid in the liquid cooled cable may be an antifreeze or a combination of an antifreeze and water. The liquid in the cooled cable also cools the connector contacts of the connector 140 and vehicle connector inlet 155.

The EVSE 110 includes the battery thermal controller 135. The battery thermal controller 135 manages the supply of external coolant for thermal management of the internal coolant of the battery thermal system 160. The battery thermal controller 135 is communicatively connected with the battery management system (BMS) 154 of the electric vehicle 150. The BMS 154 knows the status of the battery 252 including its temperature. The BMS 154 sends a request to the battery thermal controller 135 for external coolant to change the temperature of its internal coolant to change the temperature of the battery 152. The request may indicate the current temperature of the battery 152 and/or the desired temperature of the battery 152. The battery thermal controller 135 may transmit a response to the request that indicates an expected amount of coolant, an expected temperature of the coolant, and/or an expected temperature of the battery 152 after providing the external coolant over a certain period. The communication between the battery thermal controller 135 and the BMS 154 may be provided through a data communication connection carried over the cable 138.

The battery thermal controller 135 is coupled with the EV thermal system 105 that supplies the external coolant to change the temperature of the internal coolant of the battery thermal system 160. In effect, the EV thermal system 105 acts as a thermal reservoir for cooling or heating the battery 152. The EV thermal system 105 is shown as located outside of the EVSE 110, but it may be located within the EVSE 110 in an embodiment. The external coolant and the internal coolant may be combination of antifreeze and water (e.g., a mix of propylene glycol and water). The EV thermal system 105 may be supplying coolant for multiple electric vehicles connected with multiple EVSEs.

The electric vehicle 150 includes the vehicle connector inlet 155 that connects with the connector 140. An example connector 140 and vehicle connector inlet 155 will be described in greater detail later herein. The electric vehicle 150 includes the battery thermal system 160 that manages thermal management of the battery 152.

Figure 2:
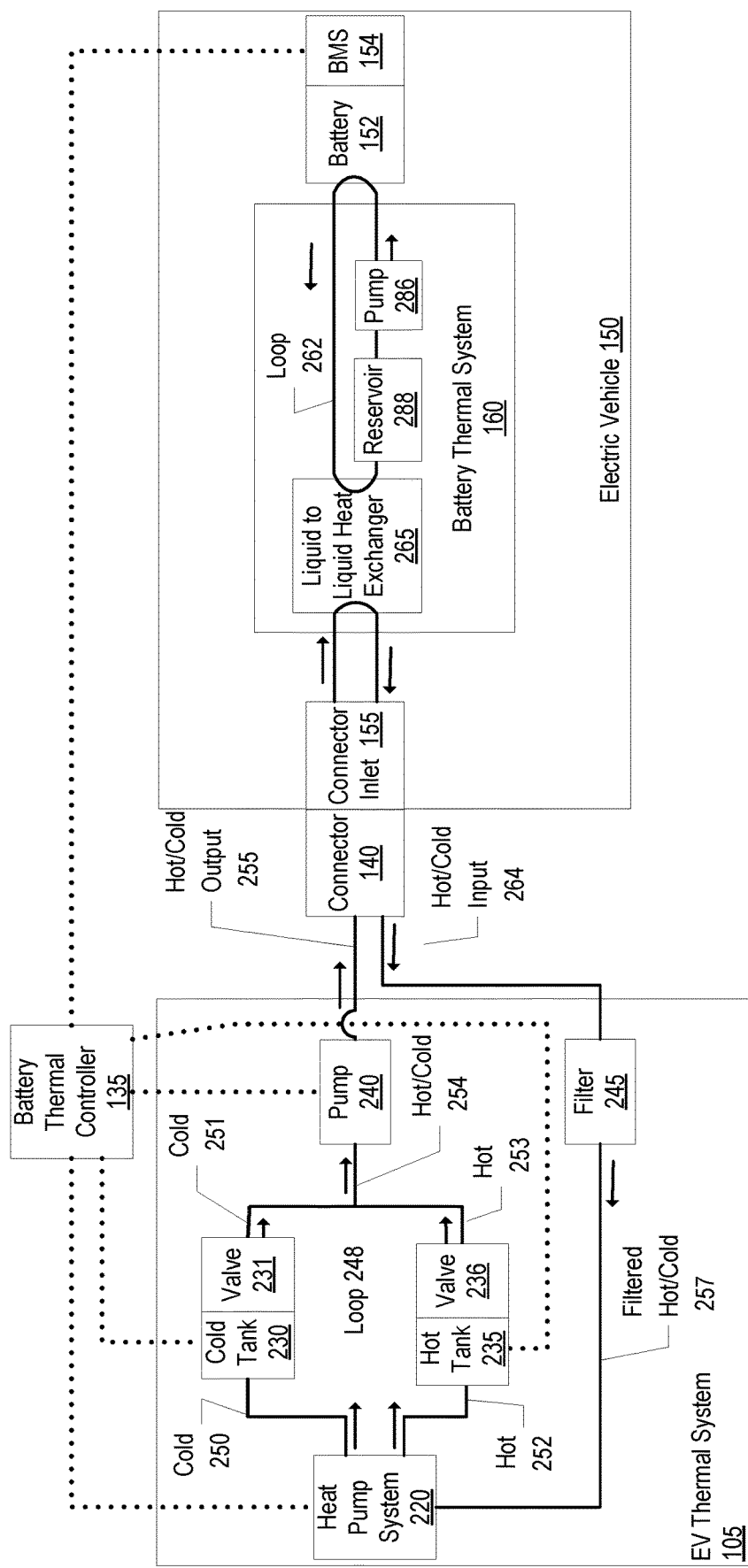
FIG. 2 shows an example of the thermal management provided by the EV thermal system to the electric vehicle according to an embodiment.

FIG. 2 shows an example of the thermal management provided by the EV thermal system 105 to the electric vehicle 150 according to an embodiment. As shown in FIG. 2, the dotted lines indicate a logical communication connection. The arrows indicate direction of the flow of the coolant.

The electric vehicle 150 includes an internal battery thermal system 160 for thermal management of the battery 152. The thermal loop 262 of the battery thermal system 160 is a closed loop that interfaces with the liquid-to-liquid heat exchanger 265 and does not mix with the thermal loop 248 of the EV thermal system 105. The internal coolant of the thermal loop 262 is cooled or heated by the external coolant supplied to the liquid-to-liquid heat exchanger 265 by the EV thermal system 105 at the other side of the liquid-to-liquid heat exchanger 265. The coolants flowing through the liquid-to-liquid heat exchanger 265 do not mix, and therefore do not pass contaminants. Thus, the external coolant of the EV thermal system 105 does not directly interface with the battery 152. The pump 286 pumps the internal coolant of the thermal loop 262 through the battery 152 to cool or heat the battery 152. The coolant reservoir 288 stores the internal coolant when it is not being pumped through the battery 152. The coolant reservoir 288 is significantly smaller than the size of the cold tank 230 and hot tank 235. Although not shown in FIG. 2, the battery thermal system 160 may include a heater and/or chiller for thermal management of the internal coolant of the thermal loop 262.

The battery thermal system 160 of the electric vehicle 150 is not efficient enough by itself to cool or warm the battery 152 in a timely manner. However, by providing the external coolant to the liquid-to-liquid heat exchanger 265 to cool or heat the internal coolant of the thermal loop 262, the battery 152 can be cooled or warmed efficiently. Because the temperature of the internal coolant of the thermal loop 262 is modified by coolant supplied externally from the electric vehicle 150, the weight and onboard volume of the battery thermal system 160 can be kept to a minimum. Thus, instead of the electric vehicle 150 having a large air conditioner to cool the internal coolant that would increase the weight and volume requirement of the electric vehicle 150, coolant is supplied externally by the external EV thermal system 105. Further, because the external coolant provided by the EV thermal system 105 does not directly interface with the battery 152, any contaminates included in the external coolant of the EV thermal system 105 will not transfer to the battery 152. Thus, the battery thermal system 160 is less prone to contamination than if the external coolant were directly interfacing with the battery 152. This system also works well for electric vehicles that do not include radiators such as a VTOL aircraft.

As previously described, the battery thermal controller 135 manages the supply of the external coolant that serves as the source of cooling or heating the internal coolant of the battery thermal system 160 of the electric vehicle 150. For instance, the battery thermal controller 135 causes the EV thermal system 105 to pump coolant through the connector 140 and the vehicle connector inlet 155 to a first side of the liquid-to-liquid heat exchanger 265 of the battery thermal system 160 to supply cooling or heating to the internal coolant in a second side of the liquid-to-liquid heat exchanger 265.

The EV thermal system 105 includes a heat pump system 220, a cold tank 230, a hot tank 235, a pump 240, and a filter 245. The cold tank 230 stores cold coolant and the hot tank 235 stores hot coolant. The cold tank 230 and the hot tank 235 may both be insulated. The volume of the cold tank 230 and the hot tank 235 depend on the charging environment. As an example, the volume of the cold tank 230 may be 900 liters and the volume of the hot tank 230 may be less. The control valve 231 opens to allow cold coolant 251 to be released and the control valve 236 opens to allow hot coolant 253 to be released. A sensor may measure the level of the cold tank 230 and a sensor may measure the level of the hot tank 235. The cold and/or hot coolant mixes as represented by the hot/cold coolant 254 that is pumped by the pump 240.

The pump 240 pumps the hot/cold coolant output 255 through the connector 140 and the connector inlet 155 through one side of the liquid-to-liquid heat exchanger 265. The rate of the external coolant being pumped may be about a liter per second.

The battery thermal controller 135 controls the control valve 231 and the control valve 236. The battery thermal controller 135 controls the flow of the coolant from the cold tank 230 and the hot tank 235 by varying the size of the flow passage through the control valve 231 and the control valve 236. The control valves 231 and 236 may be set to any position between fully open and fully closed. By controlling the control valves 231 and 236, the battery thermal controller 135 controls the flow rate, pressure, and temperature of the external coolant being pumped to the electric vehicle 150 by the pump 240.

The battery thermal controller 135 determines a desired temperature of the external coolant to be pumped to the electric vehicle 150 and causes the valve 231 and/or valve 236 to open to a set point to achieve the desired temperature. In an embodiment, the battery thermal controller 135 determines the desired temperature of the external coolant based on a requested temperature from the BMS 154. For instance, the battery thermal controller 135 may receive a request from the BMS 154 that indicates the current temperature of the battery 152 and/or the desired temperature of the battery 152. The battery thermal controller 135 determines whether the request can be granted. If it can, the battery thermal controller 135 causes the control valves 231 and/or 236 to open to a set point to meet the request. The battery thermal controller 135 may transmit a response to the request that indicates an expected amount of coolant, an expected temperature of the coolant, and/or an expected temperature of the battery 152 after providing the external coolant over a certain period. If the battery thermal controller 135 determines that the request cannot be granted, the battery thermal controller 135 may transmit a response to the request that indicates an expected amount of coolant, an expected temperature of the coolant, and/or an expected temperature of the battery 152 after providing the external coolant over a certain period in which can be fulfilled.

The return coolant (the hot/cold input 264) coming back through the connector 140 from the liquid-to-liquid heat exchanger 265 is filtered by the filter 245. The filter 245 removes contaminants from the coolant being returned from the electric vehicle 150. Although the filter 245 is shown as being prior to the coolant being returned to the heat pump system 220, the filter 245 may be anywhere in the loop 248 of the EV thermal system 105.

The heat pump system 220 causes the return coolant to be cooled and stored in the cold tank 230 and/or heated and stored in the hot tank 235. For instance, the heat pump system 220 may include a hot coil to heat the filtered hot/cold coolant 257 to make the hot coolant 252 to be stored in the hot tank 235 and include a cold coil to cool the filtered hot/cold coolant 257 to make the cold coolant 250 to be stored in the cold tank 230. If more cold coolant is needed, the coolant is run over the cold coil and put in the cold tank 230. If more hot coolant is needed, the coolant is run over the hot coil and put in the hot tank 230. The heat pump system 220 may include an exhaust fan for blowing excess heat to the environment.

In an embodiment, the battery thermal controller 135 instructs the heat pump system 220 whether to make hot coolant or cold coolant from the filtered hot/cold coolant 257. The battery thermal controller 135 may make this decision based on the level of cold coolant stored in the cold tank 230 and the level of hot coolant stored in the hot tank 235. This decision may be further based on an expected or estimated need. For instance, electric vehicles that have been operating immediately prior to connecting with the EVSE 110 likely have a hot battery 152 that needs to be cooled; and electric vehicles that have not been operating immediately prior to connecting with the EVSE 110 (e.g., docked with the EVSE 110 on a cold day) may have a cold battery 152 that may need to be warmed. The EVSE 110 may have access to historical information of when hot or cold coolant is needed. Additionally, or alternatively, the EVSE 110 may have access to scheduled use of the EVSE 110.

Although FIG. 2 does not show a pump on the return line to help evacuate the external coolant from the electric vehicle 150, in an embodiment, the EV thermal system 105 may include an additional pump on the return line to help evacuate the external coolant from the electric vehicle 150.

Figure 3:
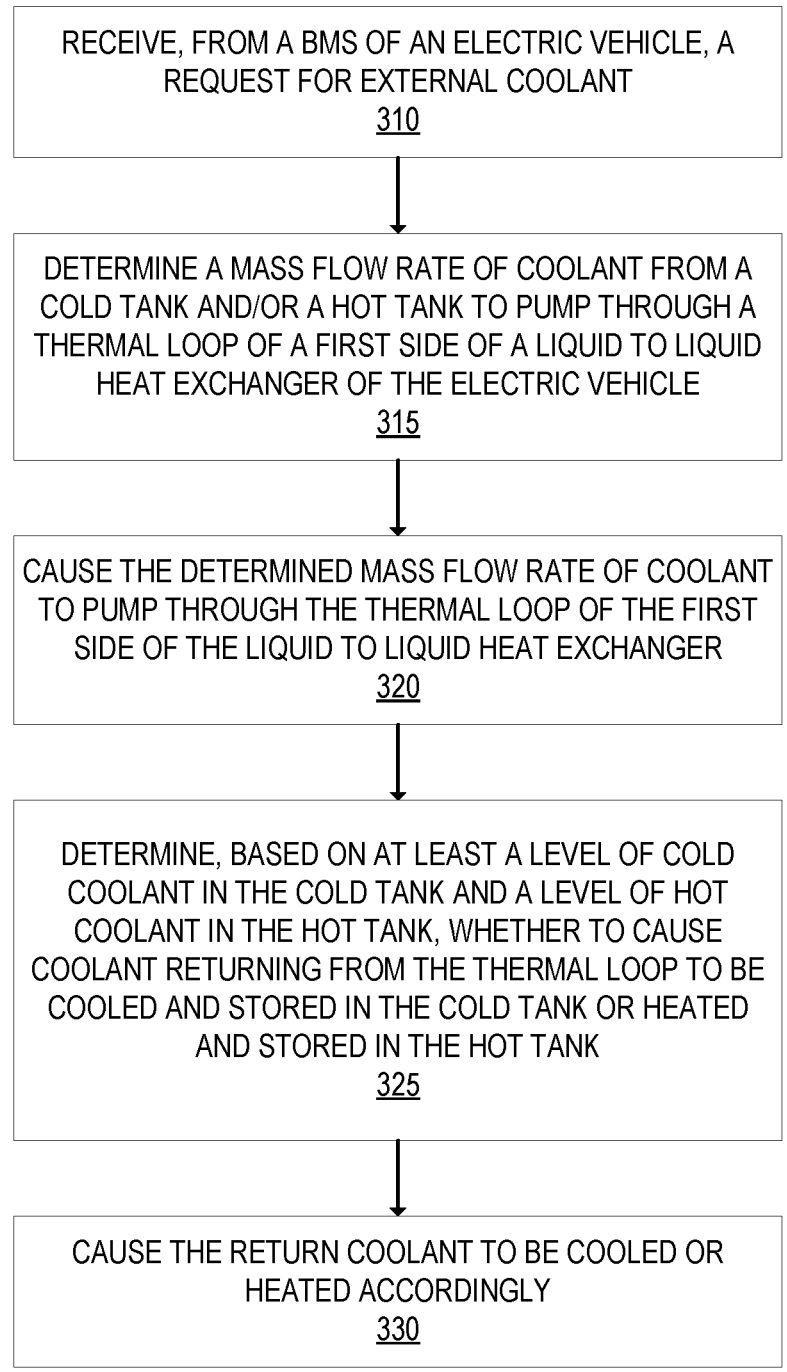
FIG. 3 is a flow diagram that shows exemplary operations for providing external thermal management for a battery system of an electric vehicle in an embodiment.

FIG. 3 is a flow diagram that shows exemplary operations for providing external thermal management for a battery system of an electric vehicle in an embodiment. The operations of FIG. 3 will be described as performed by the battery thermal controller 135 and otherwise in reference to FIGS. 2 and 1. The battery thermal controller 135 can perform additional, different, or less operations than those of FIG. 3, and the operations of FIG. 3 can be performed by different embodiments than the battery thermal controller 135.

At operation 310, the battery thermal controller 135 receives, from the BMS 154 of the electric vehicle 150, a request for external coolant. The external coolant is expected to be used to change the temperature of the internal coolant used by the electric vehicle 150 to change the temperature of its battery 152 (either cool or warm the battery). The request may indicate the current temperature of the battery 152 and/or the desired temperature of the battery 152. The request may be a request to provide external coolant without specifying the temperature of the battery. If the battery thermal controller 135 determines that it cannot grant the request (e.g., if not enough coolant at a determined temperature is available to be provided), the battery thermal controller 135 may transmit a response to the request that indicates an expected amount of coolant, an expected temperature of the coolant, and/or an expected temperature of the battery 152 after providing the external coolant over a certain period.

Next, at operation 315, the battery thermal controller 135 determines the mass flow rate of coolant to release from the cold tank 230 and/or the mass flow rate of coolant to release from the hot tank 235 to pump through the thermal loop of the first side of the liquid-to-liquid heat exchanger 265. This determination is based at least in part on a determined temperature of the external coolant to be provided to the electric vehicle 150 and the thermal requirements of the electric vehicle 150.

Next, at operation 320, the battery thermal controller 135 causes the determined mass flow rate of coolant to pump through the thermal loop of the first side of the liquid-to-liquid heat exchanger 265. For example, the battery thermal controller 135 may cause the control valve 231 and/or the control valve 236 to open to a set point to achieve the determined temperature and cause the pump 240 pump the external coolant through the thermal loop of the first side of the liquid-to-liquid heat exchanger 265. The battery thermal controller 135 may control the rate of the pump.

Next, at operation 325, the battery thermal controller 135 determines, based at least on a level of cold coolant in the cold tank 230 and a level of hot coolant in the hot tank 235, whether to cause coolant returning from the thermal loop to be cooled and stored in the cold tank 230 or heated and stored in the hot tank 235. This determination may be further based on an expected or estimated need. For instance, electric vehicles that have been operating immediately prior to connecting with the EVSE 110 likely have a hot battery 152 that needs to be cooled; and electric vehicles that have not been operating immediately prior to connecting with the EVSE 110 (e.g., docked with the EVSE 110 on a cold day) may have a cold battery 152 that may need to be warmed. The EVSE 110 may have access to historical information of when hot or cold coolant is needed. Additionally, or alternatively, the EVSE 110 may have access to scheduled use of the EVSE 110.

Next, at operation 330, the battery thermal controller 135 causes the return coolant to be cooled or heated accordingly. For instance, the battery thermal controller 135 instructs the heat pump system 220 to cool or heat the return coolant accordingly.

Figure 4:
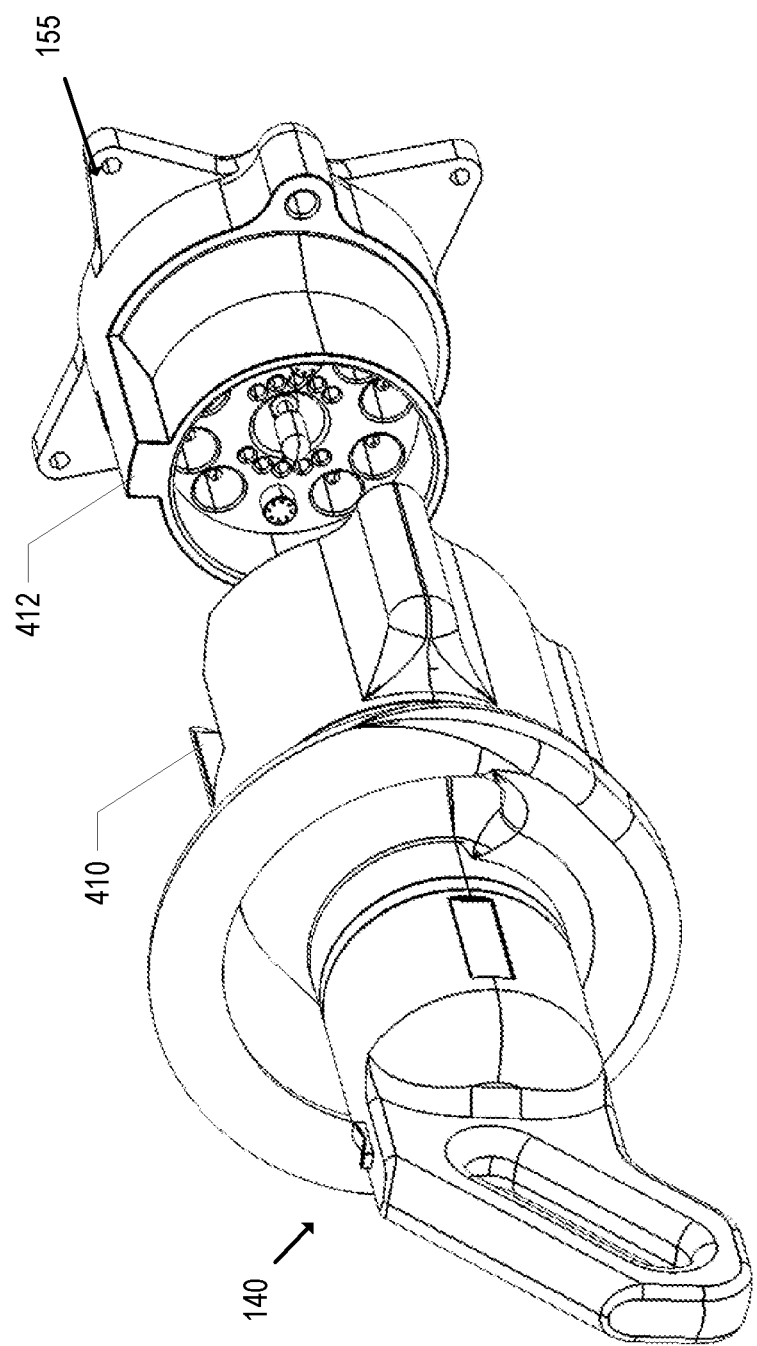
FIG. 4 shows a view of an exemplary connector and vehicle connector inlet according to an embodiment.
Figure 5:
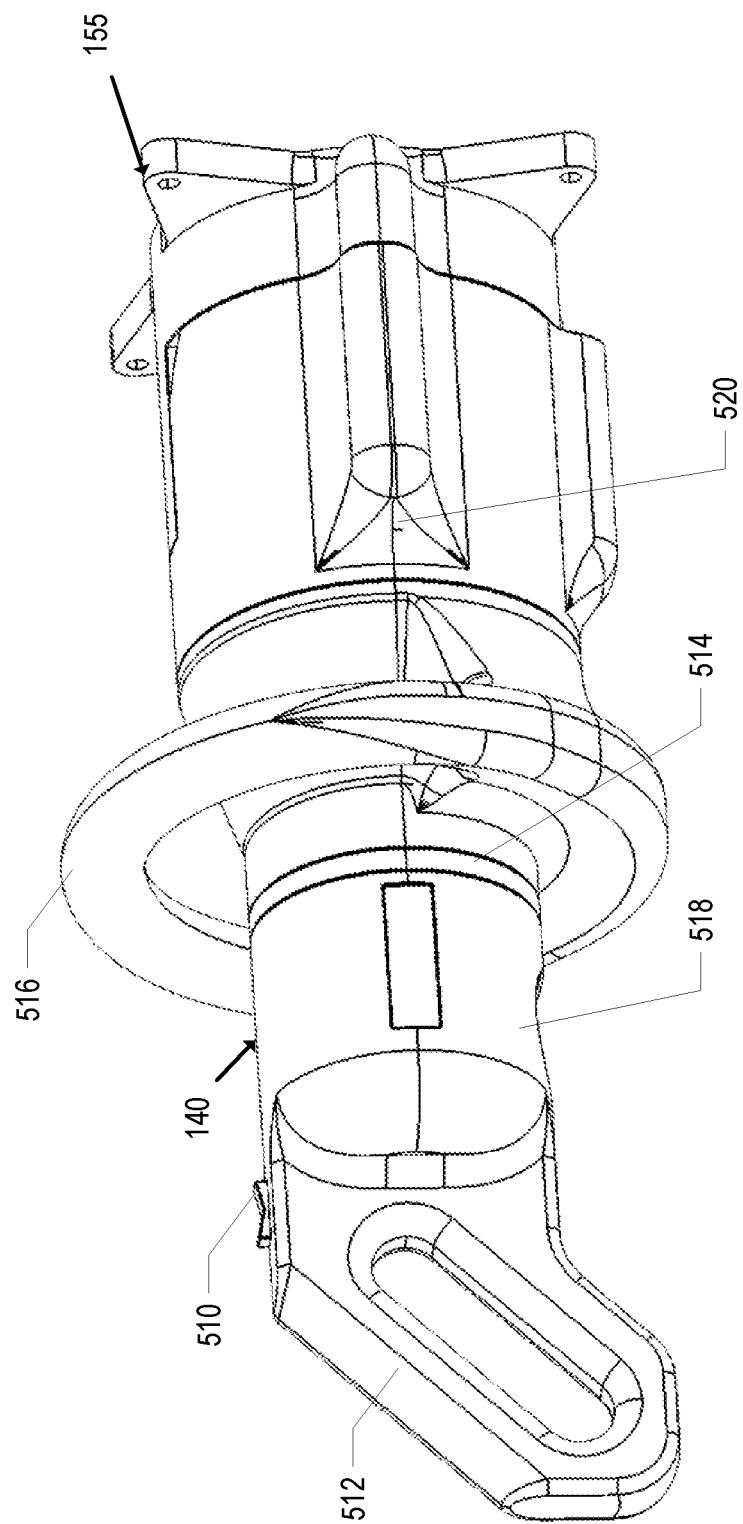
FIG. 5 shows the connector of FIG. 4 in a mated state with the vehicle connector inlet.

As previously described, the connector 140 includes connections for charging the battery 152 and connections for the external coolant provided as a source to the liquid-to-liquid heat exchanger 265. FIG. 4 shows a view of an exemplary connector 140 and vehicle connector inlet 155 according to an embodiment. The vehicle connector inlet 155 is secured to the electric vehicle 150 and is configured to mate with the connector 140. FIG. 4 shows the connector 140 in an unmated state with the vehicle connector inlet 155. FIG. 5 shows the connector 140 in a mated state with the vehicle connector inlet 155.

The connector 140 includes a guide feature 410 that is cutout from the connector 140 and configured to allow the raised portion 412 of the vehicle connector inlet 155 to fit in the cutout portion of the connector 140. This helps ensure the proper orientation of the connector 140 so that the connector 140 cannot be tried to be inserted upside down, for example. The connector includes a first handle portion 512 and a second handle portion 516 for use when inserting the connector 140 into the vehicle connector inlet 155.

The connector 140 includes the light ring 514 that provides status indication. For example, the light ring 514 may be illuminated in different color lights to indicate different status. Example status may include whether the EVSE 110 is available, whether the EVSE 110 is currently charging the electric vehicle 150, whether there is an error, whether the electric vehicle 150 is finished charging, etc.

Although the cable 138 is not shown, the connector 140 includes the cable entry point 518. The connector 140 also includes the hose connection point 520 for one of the battery thermal system hoses. On the other side of the connector 140 there is a similar hose connection point for another one of the battery thermal system hoses. In an embodiment, the battery thermal system hoses are bundled with the cable 138 but not inside the jacket of the cable 138. In another embodiment, the battery thermal system hoses are inside the jacket of the cable 138.

Features of the connector 140 may include a rubber over-mold surface for drop protection. For example, features that are likely to hit the ground or other surface when dropped may include a rubber over-mold surface. For example, the outside of the first handle portion 512 and the outside of the second handle portion 516 may include a rubber over-mold surface. The outside of the hose connection points may include a rubber over-mold surface.

The connector 140 includes a forward and reverse button 510 that is used to control a powered insertion of the connector 140 into the connector inlet 155 and a powered retraction assistance for retracting the connector 140 from the connector inlet 155. The powered insertion assistance is used to overcome the high insertion force for connecting the connector 140 to the connector inlet 155.

Figure 6:
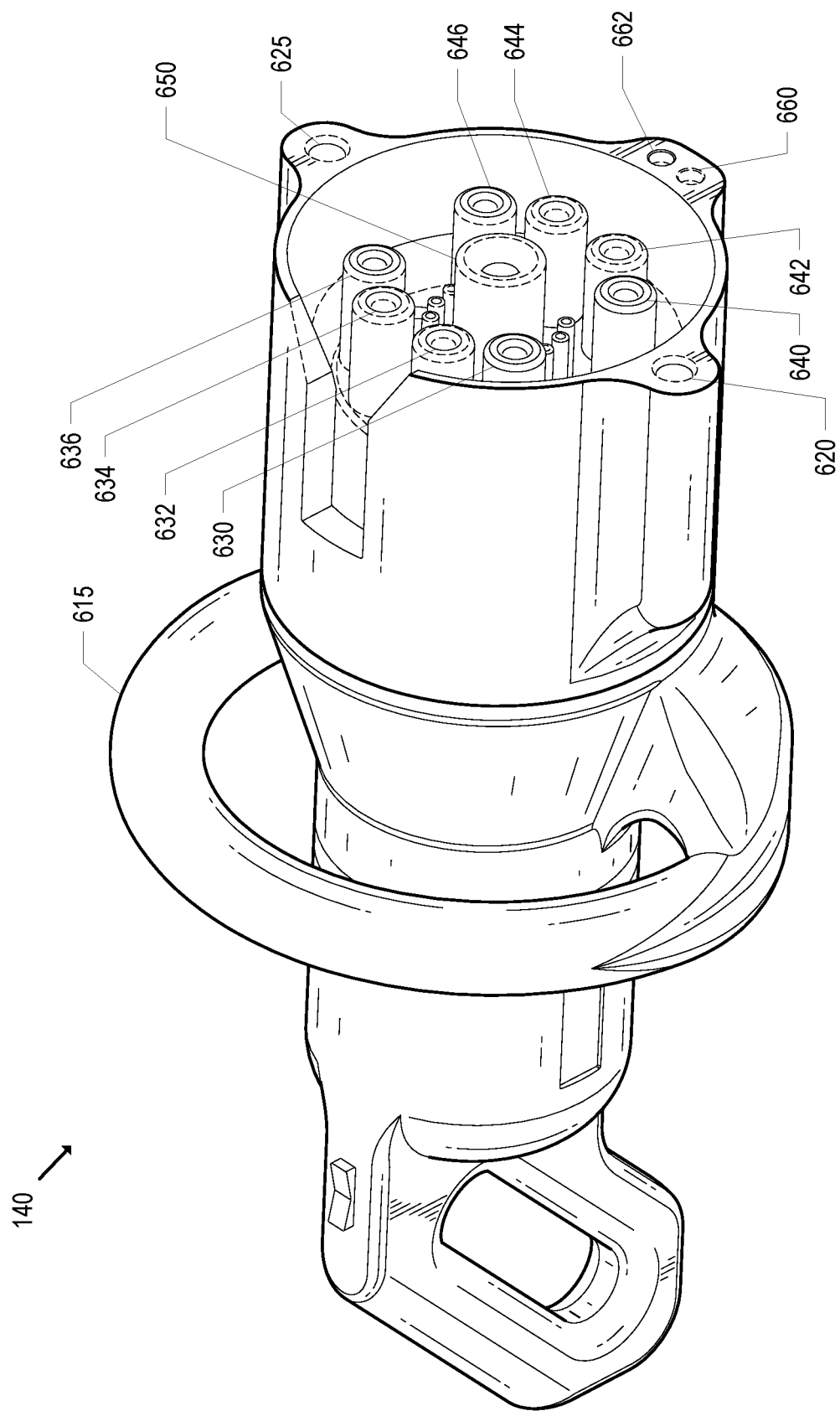
FIG. 6 shows a view of the connector in a perspective view.
Figure 7:
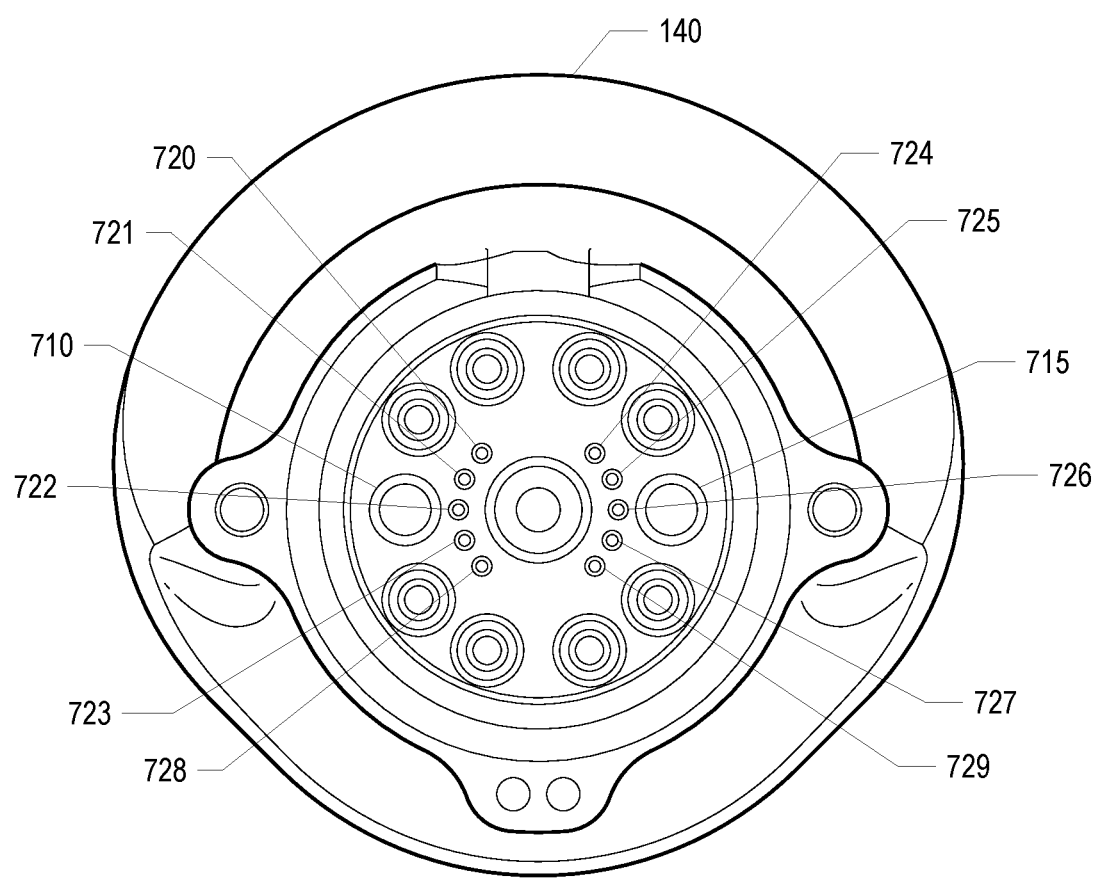
FIG. 7 shows a view of the connector in a front view.
Figure 8:
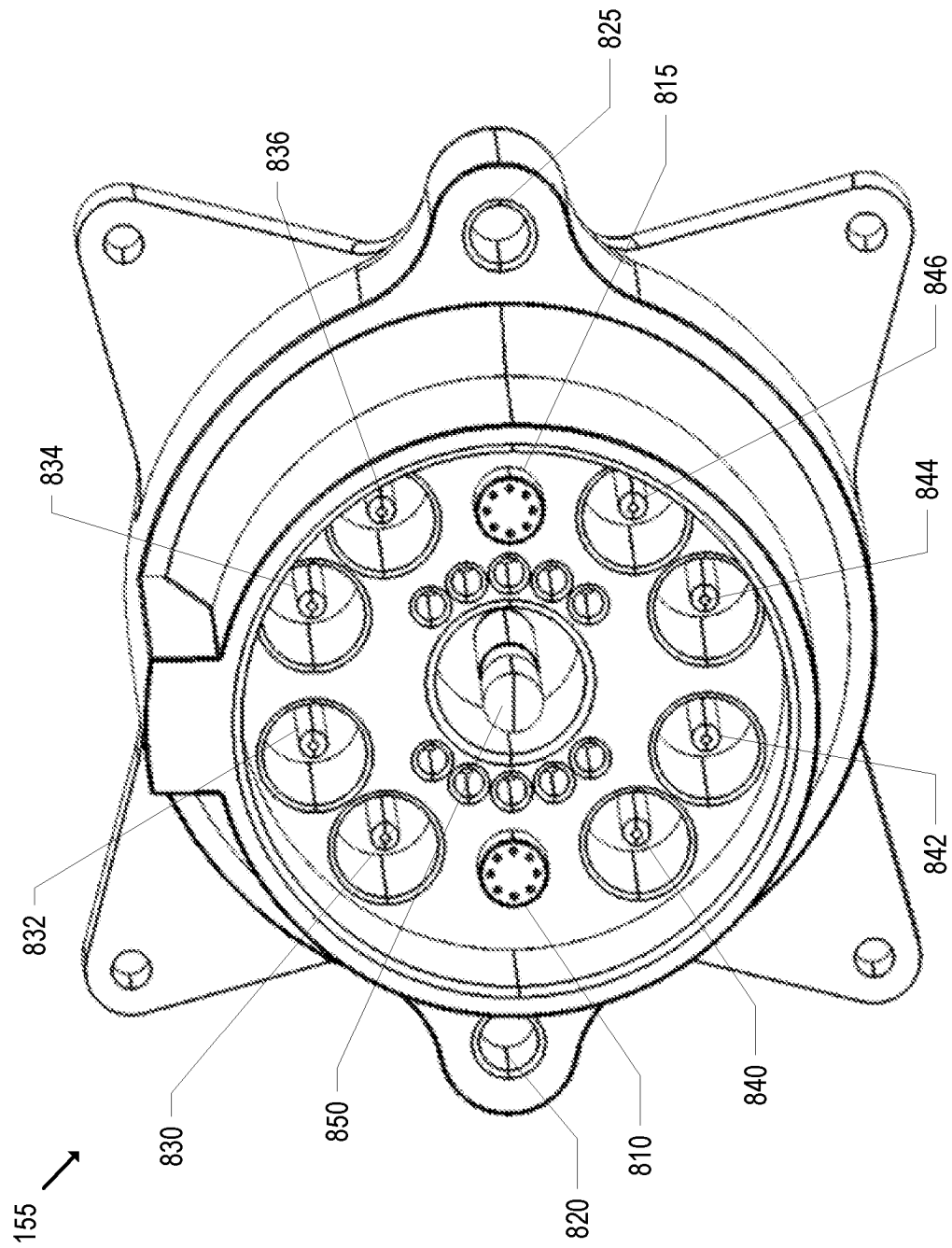
FIG. 8 shows a view of the connector inlet in a perspective view.
Figure 9:
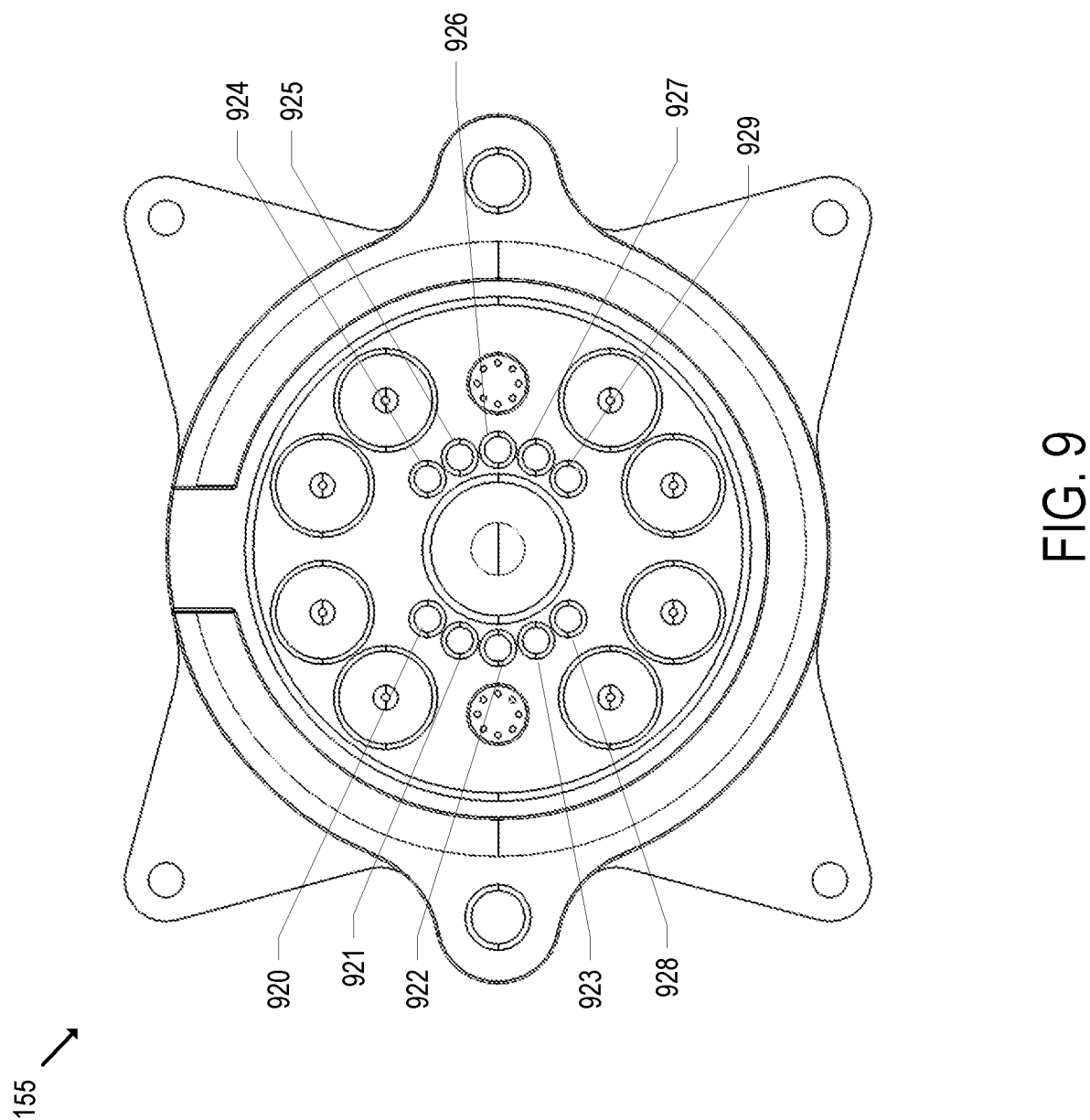
FIG. 9 shows a front view of the connector inlet.

FIG. 6 shows a view of the connector 140 in a perspective view and FIG. 7 shows a view of the connector 140 in a front view. FIG. 8 shows a view of the connector inlet 155 and FIG. 9 shows a front view of the connector inlet 155.

The connector 140 includes 8 pairs of sockets for delivering current to the battery 152. For example, the connector 140 includes the DC+1 630 socket, the DC+2 632 socket, the DC+3 634 socket, the DC+4 636 socket, the DC−1 640 socket, the DC−2 642 socket, the DC−3 644 socket, and the DC−4 646 socket. The sockets are configured to mate with the corresponding pins of the connector inlet 155. Thus, the sockets 630, 632, 634, 636, 640, 642, 644, and 646 respectively mate with the pins 830, 832, 834, 836, 840, 842, 844, and 846 of the connector inlet 155. Although 8 pairs of socket/pins are shown, more or less socket/pins may be used depending on the power requirements of the electric vehicle 150. In the example shown, there are eight pairs of socket/pins because the system has been designed to be used with an electric vehicle that has up to four separate battery packs (2 power socket/pins per battery pack). At any given time, the separate battery packs may have different charging requirements (e.g., different current rates and/or voltages). The pins 830, 832, 834, 836, 840, 842, 844, and 846 of the connector inlet 155 may be 8 mm high voltage pins. The sockets/pins may be rated at 500 amps.

Figure 10:
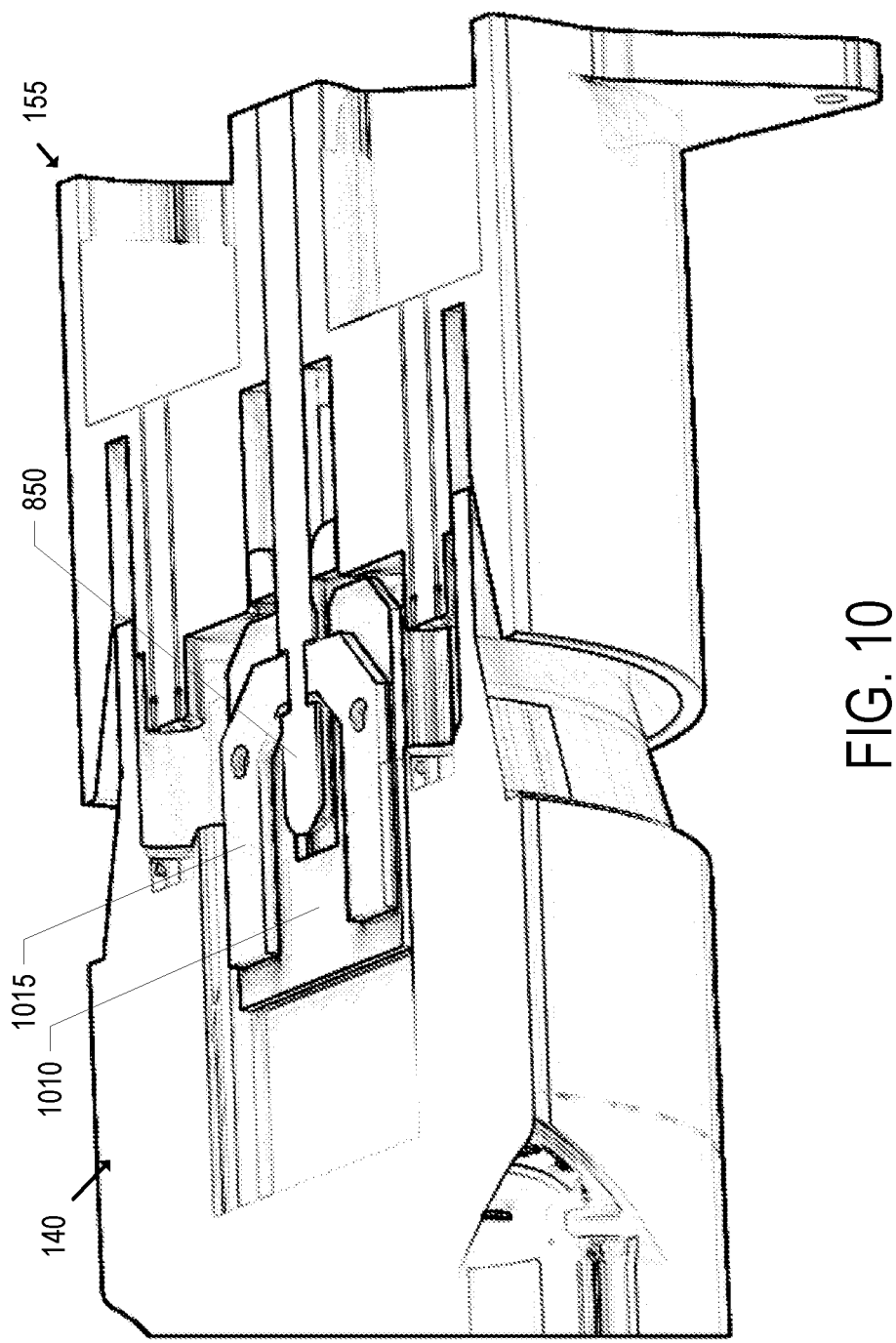
FIG. 10 shows an example of a barbed drawbar mechanism for grabbing the barb according to an embodiment.

The connector 140 includes the guide pin socket 650 that serves as an alignment point for powered insertion assistance. The powered insertion assistance, enabled through the actuation of the forward position of the forward and reverse button 510, causes a motor to grab the barb 850 of the connector inlet 155 and pull the connector 140 to the connector inlet 155. FIG. 10 shows an example of a powered insertion assistance that uses a barbed drawbar mechanism for grabbing the barb 850. The drawbar 1010 extends from the guide pin socket 650, latches on the barb 850 with a hook mechanism 1015 and pulls the hook back with a leadscrew to cause the connector 140 to be pulled into the connector inlet 155. In another embodiment, the connector 140 threads onto a threaded drawbar and screws itself into the connector inlet 155 through use of the motor.

The connector 140 includes the coolant ports 620 and 625 that connect to the coolant ports 820 and 825 for carrying the external coolant of the loop for cooling or heating the liquid-to-liquid heat exchanger 265. Although not shown, quick disconnects may be used to couple the coolant ports 620 and 625 with the coolant ports 820 and 825 respectively. One of the coolant ports is for output to the electric vehicle 150 and the other port is for the return coolant from the electric vehicle 150.

The connector includes the camera port 960 and the light port 662. In an embodiment, the connector 140 is connected to the connector inlet 155 through an autonomous system. In such a system, the light illuminates the connector inlet 155 and the camera recognizes the features of the connector inlet 155 to guide the connector 140 into the connector inlet 155.

The connector 140 includes the data communication sockets 720-727 that are configured to mate with the corresponding pins 920-927 of the connector inlet 155. The connector 140 includes the ground sockets 728 and 729 that are configured to mate with the corresponding pins 928 and 929 of the connector inlet 155 respectively. The data communication socket/pins are used for communicating between the EVSE 110 and the electric vehicle 150. The example connector shown includes eight data communication socket pairs because it has been designed to be used with an electric vehicle that has up to four separate battery packs (2 data communication socket pairs per battery pack). The communication may include negotiating the current available for the battery pack, for example. The communication may include information between the battery thermal controller 135 and the BMS 154.

The connector 140 includes the high-speed data communication sockets 710 and 715 that are configured to mate with the corresponding high-speed data communication pins 810 and 815 of the connector inlet 155 respectively. The high-speed data communications connections may be used to exchange data of the electric vehicle 150 that is not necessarily related to managing charging. For instance, the electric vehicle 150 may send navigation information such as maps, flight plans, etc.

Although it has been described that the coolant may be provided in the same cable or bundled with the cable that provides charging of the battery, in an embodiment the coolant is provided through a separate cable that is not bundled with the charging cable for charging the battery. In such an embodiment, the charging may be provided through a separate charging cable and/or performed wirelessly through inductive charging.

Although the preceding description has described the coolant being provided to the battery thermal system of the electric vehicle in a single battery thermal system hose, in an embodiment the external coolant may be provided in multiple battery thermal system hoses. For example, there may be multiple battery thermal system hoses providing coolant (at possibly different temperature) for multiple battery thermal systems for multiple batteries of the electric vehicle.

In the preceding description, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The techniques shown in the figures can be implemented using code and data stored and executed on one or more electronic devices (e.g., an EVSE, a server, an electric vehicle). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, from a battery management system of an electric vehicle, a request for an external coolant to change a temperature of a battery of the electric vehicle;
   determining a mass flow rate of cold coolant stored in a cold tank of an electric vehicle thermal system to pump through a first thermal loop of a first side of a liquid to liquid heat exchanger located on the electric vehicle, wherein the first thermal loop of the first side of the liquid to liquid heat exchanger does not mix with an internal coolant of a second thermal loop of a second side of the liquid to liquid heat exchanger located on the electric vehicle;
   causing the determined mass flow rate of the cold coolant to pump through the first thermal loop of the first side of the liquid to liquid heat exchanger;
   determining, based at least on a level of cold coolant stored in the cold tank and a level of hot coolant stored in a hot tank and on an estimated need of the cold coolant and the hot coolant, whether to cause coolant returning from the first thermal loop to be cooled and stored in the cold tank or heated and stored in the hot tank, wherein the estimated need of the cold coolant and the hot coolant is determined based on one or more of usage history of the electrical vehicle, historical information indicating when the cold coolant and the hot coolant are needed, and a scheduled use of an electric vehicle supply equipment (EVSE); and
   causing the coolant returning to be cooled or heated according to the determination.

2. The method of claim 1, wherein the request for external coolant includes a current temperature of the battery.

3. The method of claim 1, wherein the request for external coolant includes a requested temperature of the battery.

4. The method of claim 1, further comprising determining a mass flow rate of hot coolant stored in the hot tank of the electric vehicle thermal system to pump through the first thermal loop of the first side of the liquid to liquid heat exchanger.

5. The method of claim 1, wherein the external coolant is carried through a connector that connects an electric vehicle supply equipment (EVSE) with the electric vehicle.

6. The method of claim 5, wherein the connector includes a set of one or more power connections to carry power to charge the battery of the electric vehicle through the EVSE.

7. An electric vehicle, comprising:
   a set of one or more batteries;
   a battery thermal system that includes:
      a liquid to liquid heat exchanger that is to receive on a first side of the liquid to liquid heat exchanger an external coolant from an external electric vehicle thermal system and is to receive on a second side of the liquid to liquid heat exchanger an internal coolant, wherein the external coolant flowing through the first side of the liquid to liquid heat exchanger changes a temperature of the internal coolant flowing through the second side of the liquid to liquid heat exchanger, wherein the external coolant and the internal coolant do not mix, and wherein the external coolant does not directly interface with the set of one or more batteries, and
      a pump to pump the internal coolant that is output from the second side of the liquid to liquid heat exchanger through the set of one or more batteries; and
   a connector inlet having a raised portion to mate with a cutout guide feature of a connector of an electric vehicle supply equipment (EVSE) to provide proper orientation of the connector.

8. The electric vehicle of claim 7, further comprising:
   a battery management system coupled to the set of one or more batteries and communicatively coupled with a battery thermal controller external to the electric vehicle, the battery management system to transmit a request to the battery thermal controller for the external coolant.

9. The electric vehicle of claim 8, wherein the request includes an indication of a current temperature of the set of one or more batteries.

10. The electric vehicle of claim 8, wherein the request includes an indication of a requested temperature of the set of one or more batteries.

11. The electric vehicle of claim 8,
    wherein the connector inlet includes a first port to receive the external coolant from the external electric vehicle thermal system and a second port to carry return coolant to the external electric vehicle thermal system.

12. The electric vehicle of claim 11, wherein the connector inlet further includes one or more power connections to draw power to charge the set of one or more batteries through the EVSE.

13. A connector for an electric vehicle, comprising:
    a powered insertion and retraction assistance that is to assist coupling of the connector with a vehicle connector inlet;
    a cutout guide feature that is configured to fit around a raised portion of the vehicle connector inlet to provide proper orientation of the connector;
    a light ring to provide status indication;
    a plurality of sockets to mate with corresponding pins to deliver current to a battery of the electric vehicle; and
    a plurality of liquid ports for quick disconnect fittings to exchange liquid coolant with the electric vehicle.

14. The connector of claim 13, wherein the light ring is to illuminate in different color light to indicate different status, wherein the status includes one or more of whether charging is currently occurring, whether there is an error, and whether charging is finished.

15. The connector of claim 13, further comprising:
    a light port to include a light to illuminate the vehicle connector inlet;

a camera port to include a camera to recognize features of the vehicle connector inlet for use by an autonomous system in connecting the connector to the vehicle connector inlet.

16. The connector of claim 13, further comprising:

a high-speed data communication socket that is configured to mate with a corresponding high-speed data communication pin of the vehicle connector inlet.

\* \* \* \* \*